Patented July 6, 1937

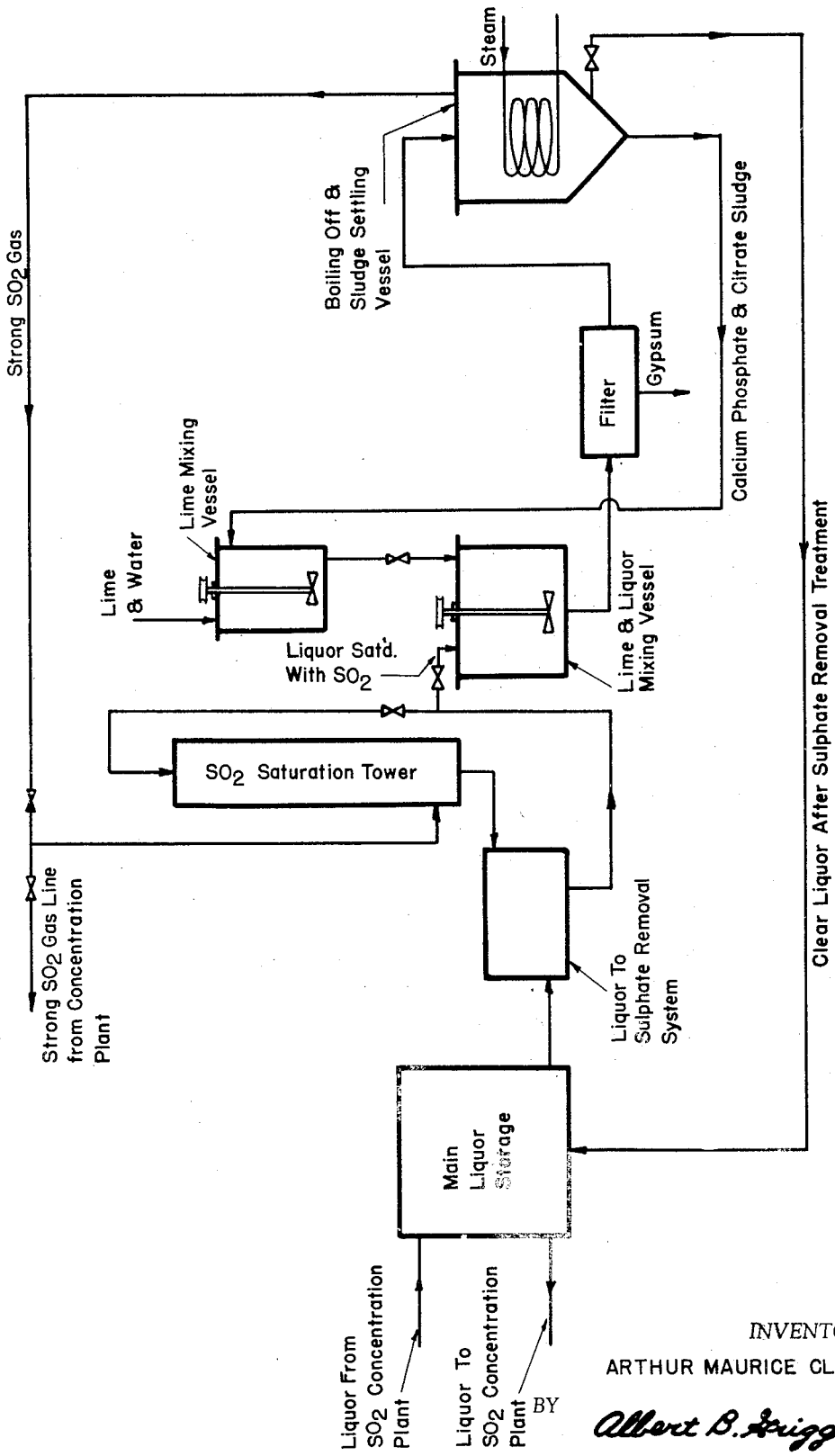

2,086,379

UNITED STATES PATENT OFFICE 2,086,379

GAS ABSORPTION PROCESS

Arthur Maurice Clark, The Green, Norton-on-Tees, England, assignor to Imperial Chemical Industries Limited, a corporation of Great Britain Application March 10, 1934, Serial No. 714,999
In Great Britain May 3, 1933

13 Claims. (Cl. 23—178)

This invention relates to processes for the absorption of sulphur dioxide from gases, particularly in phosphate-citrate solutions and has for its object the removal of sulphuric acid which accumulates therein, as gypsum.

In processes for the recovery of sulphur dioxide from gas mixtures in which the sulphur dioxide is absorbed in aqueous solutions of suitable salts and subsequently expelled from solution by heating and/or reduction of pressure (hereinafter referred to as regenerative absorption processes for $SO_2$), the absorption efficiency of the regenerated solution gradually becomes reduced on account of increased acidity due to the oxidation of a portion of the sulphur dioxide to sulphuric acid. This difficulty can be overcome by continuously or intermittently removing a suitable amount of the regenerated solution from the system and replacing it by fresh salt solution, but this procedure is uneconomical on account of the loss of valuable salts with the discarded liquor.

It has previously been suggested to remove the sulphuric acid in the form of an insoluble sulphate, e. g. barium sulphate, but the precipitate obtained by the addition of barium carbonate or baryta is difficult to separate. On the other hand, the addition of lime compounds for the purpose of precipitating the sulphuric acid as gypsum, which as is well known can be obtained in the form of comparatively large crystals, would a priori be regarded as impracticable owing to the relatively high solubility of gypsum in the solutions from which sulphuric acid is to be removed.

I have now found that provided a substantial amount of neutral sulphate is present in the solution, the sulphuric acid can be satisfactorily removed in the form of gypsum. By neutral sulphate I means a soluble, neutral salt of sulphuric acid, such as $Na_2SO_4$, $K_2SO_4$, or $(NH_4)_2SO_4$.

Thus, in one form of my invention, a portion of the absorption liquor containing a salt of a suitable weak acid, e. g. sodium citrate, neutral sulphate, sulphuric acid and absorbed $SO_2$, is treated with lime, or a calcium salt of a volatile acid, e. g. calcium carbonate or calcium sulphite, to precipitate gypsum, $CaSO_4.2H_2O$. The gypsum crystals are removed by filtration. Any calcium ions remaining in solution are removed by a second precipitation, in the form of insoluble calcium salts of other acid radicles, e. g. citrate, by removing the $SO_2$ from the solution. The calcium salts may be used for the treatment of a further portion of acid liquor together with fresh lime, by which means the useful acid radicles contained in the second precipitate are again taken into solution, and the liquor is returned to circulation in the absorption system.

In order to convert the maximum amount of sulphuric acid to gypsum, it is advisable to have a comparatively large quantity of neutral sulphate, about 10 per cent, by weight, in the liquor under treatment. This may be obtained either by neutralizing the sulphuric acid first formed by means of a suitable alkali, such as caustic soda or sodium carbonate, until the desired concentration of neutral sulphate is reached in the circulating liquor, or by adding a soluble sulphate to the initial liquor or to the portion of the liquor which is treated for removal of sulphuric acid. When dilute $SO_2$ gases are being treated, it is sometimes desirable to add a further quantity of $SO_2$ to the liquor from which gypsum is to be precipitated, in order to prevent premature precipitation of calcium salts other than gypsum. The amount of lime added should be sufficient to precipitate the whole of the sulphuric acid as gypsum together with some of the sulphate present as neutral sulphate, but care should be taken not to add too much lime as otherwise calcium salts of the other acids present in solution, in the form of citrates or phosphates, for example, may be precipitated. The residual solution contains an excess of basic ions over acid ions, and on returning this solution to the main bulk of liquor these excess basic ions serve to neutralize a further quantity of the sulphuric acid formed by oxidation of $SO_2$. If the quantity of purge liquor and added lime is suitably chosen, the net effect, therefore, may be equivalent to removing all the accumulated sulphuric acid from the whole bulk of the absorption liquor by the treatment of only a small portion of the total amount.

The temperature at which the precipitation of gypsum is effected is preferably about room temperature, although higher temperatures may be used if care is taken that the solution does not lose too much $SO_2$.

In the accompanying drawing, there is shown an illustrative process for the removal of sulphuric acid from the absorption liquor used in a regenerative sulphur dioxide absorption system. The processes of this invention are further illustrated by the following example:

Example 1

10 cubic metres of liquor containing 300 grams per liter of $NaH_2PO_4$ and 130 grams per liter of sodium citrate are circulated in a regenerative absorption system for $SO_2$, the gases under treatment being smelter gases containing 7 per cent of $SO_2$. The sulphuric acid which gradually accumulates in the liquor is continuously neutralized with NaOH until the liquor contains 100 grams per liter of sodium sulphate. The neutralization with NaOH is then discontinued, and a further amount of $H_2SO_4$ is allowed to accumulate until the solution contains about 10 grams per liter of free $H_2SO_4$. At this stage 3 cubic metres of regenerated liquor, i. e. liquor from which $SO_2$ has been expelled, are removed from the system and are treated with concentrated $SO_2$ until about 120 grams per liter of the gas have become absorbed. The resulting liquor is then treated at room temperature with 115 kg. of CaO, after which it is stirred for three hours. About one-half of the lime is precipitated as gypsum, which is removed by filtration. The filtrate is heated to remove $SO_2$ and to precipitate the remaining lime as a mixture of calcium phosphate and citrate.

The amount of sulphate thus removed from the liquor is equivalent to about 100 kg. of $H_2SO_4$. The treated liquor is returned to the main bulk and the sulphate content of the whole circulating liquor thus decreased by an amount equivalent to 100 kg. of $H_2SO_4$ in 10 cubic metres of liquor.

The liquor is circulated until the concentration of free sulphuric acid has again reached 10 grams per liter, when the previous treatment is repeated. In this case, however, the calcium phosphate and citrate which were precipitated in the second stage of the first treatment are used to replace an equivalent amount of lime in the first stage of the process and the valuable phosphate and citrate ions thus returned to the system.

As apart from the phosphate and citrate ions which have been removed from the system, and which are later returned to the system, the only constituent other than water which has been removed from the liquor is sulphuric acid, the net effect is to remove from the whole bulk of liquor the free sulphuric acid which had been allowed to accumulate, viz. 10 grams per liter.

By this means the neutral sulphate content of the liquor is maintained at a substantially constant value and sulphuric acid is prevented from accumulating.

Following a slightly modified procedure I avoid the necessity of precipitating the calcium salts as citrates, etc.

In this procedure also salts of weak acids are used for the absorption and recovery of sulphur dioxide from gases and accumulated free sulphuric acid is removed as gypsum from the solution saturated with sulphur dioxide, by the addition of a suitable amount of lime or calcium salt of a volatile acid. Provided the solution in which the gypsum precipitation is effected contains substantial amounts of neutral sulphate and ammonium salt or salts the boiling of the filtrate can be omitted without any precipitation of insoluble calcium salts occurring in the absorption regenerative system. It is preferred to use ammonium salts of the weak acids and ammonium sulphate as the neutral sulphate.

In order to obtain as large a removal of sulphuric acid as possible in the form of gypsum, it is preferable to have as high a concentration of sulphate as is conveniently possible, in order to depress the solubility of calcium sulphate.

The neutral sulphate content may be obtained by neutralizing the sulphuric acid first formed, preferably with ammonia, until the desired concentration is reached in the circulating liquor.

Alternatively, neutral sulphate may be added to the initial solution or to a portion which after use in the absorption-regeneration system is treated for removal of sulphuric acid.

When sulphur dioxide is being absorbed from weak gases, the sulphur dioxide concentration of the solution may be somewhat low, in which case further sulphur dioxide is preferably passed into the solution in order to prevent possible precipitation of calcium salts other than gypsum. Also, too much lime or equivalent calcium salt should not be added to the solution, as otherwise serious loss of valuable constituents of the absorption liquor by precipitation with the gypsum is likely to occur, and also a sufficiently high concentration of calcium may be left in the solution to necessitate boiling before its return to the absorption-regeneration system.

When a portion of the total solution in the absorption-regeneration system is extracted from the system for removal of sulphuric acid, the amount of lime added should preferably be sufficient to precipitate the whole of the sulphuric acid which it contains and also some of the sulphate. The treated portion thereby becomes alkaline, and on return to the main body of solution serves to neutralize a further quantity of sulphuric acid, so that by suitable choice of amounts of purge liquor and lime added thereto, it is possible to neutralize the sulphuric acid content of the whole of the solution.

Solutions of ammonium citrate and ammonium phosphate and containing also ammonium sulphate have been found to be particularly advantageous.

*Example 2*

A regenerative absorption process for $SO_2$ is operated with a solution containing 250 gms./liter of monoammonium phosphate, 100 gms. of citric acid (neutralized with ammonia) and 100 gms. of ammonium sulphate, until free sulphuric acid has accumulated in the liquor to the extent of 0.25 gm. per liter. An amount of liquor is then removed from the system corresponding to 1 liter for every 160 liters in circulation.

This liquor is then saturated with sulphur dioxide by circulating it through a packed tower, up which is passed a stream of pure sulphur dioxide gas. After saturation the liquor contains 180 gms. of sulphur dioxide per liter of solution.

Hydrated lime, previously mixed with water to form milk of lime, is now added to the solution in the proportion of 28 gms. of lime (expressed as CaO) to each liter of solution. The solution is stirred for one hour, and then filtered. The solid material removed by filtration consists of almost pure gypsum, containing only a small amount of phosphate. The amount of gypsum removed is about 70 grams per liter of solution, equivalent to 80%–85% of the lime added. The amount of sulphate contained in the gypsum corresponds to the removal of 40 grams per liter of sulphuric acid from the solution treated. The residual lime, not precipitated as gypsum, remains permanently in solution, and no further precipitate can be obtained by boiling the liquor.

The treated liquor, after removal of gypsum, is returned to the main bulk, where it serves to neutralize the free sulphuric acid in the whole system.

The process is repeated at intervals, as necessitated by the further accumulation of sulphuric acid in the liquor. Owing to the small amount of lime remaining in the treated liquor, lime will gradually accumulate in the whole system until the concentration of CaO in the main bulk of the liquor is the same as that in the treated liquor. When this stage is reached, the amount of gypsum obtained on treatment of a portion of the liquor with lime will be equivalent to the whole of the added lime, and the concentration of lime in the main bulk of liquor will, therefore, show no further increase.

The presence of this amount of lime in the absorption liquor has no adverse effect on its absorptive properties, and does not cause precipitation of calcium salts in any part of the system.

The free sulphuric acid may be allowed to accumulate to any desired figure, for example, it may be allowed to rise to 10 gms. per liter before removal. It is, however, preferred to keep the amount of free sulphuric acid at a lower figure such as 0.25 gm./liter, since with high concentrations the efficiency of sulphur dioxide absorption-regeneration decreases, and a larger proportion of the liquor must be treated to bring back the circulation liquor to about the neutral point.

It is noted that the use of phosphate-citrate solutions and the like is disclosed and claimed in U. S. patent application Serial Number 669,789, filed May 6, 1933, by Daniel Tyrer, and constitutes no part of the present invention.

I claim:

1. In a regenerative absorption process for sulphur dioxide, the steps comprising: absorbing sulphur dioxide in a solution which contains a soluble phosphate, a soluble citrate, and a sulphate selected from the group consisting of sodium sulphate, potassium sulphate, and ammonium sulphate, and adding a calcium compound selected from the group consisting of lime and calcium salts of volatile acids.

2. In a regenerative absorption process for sulphur dioxide, the steps comprising: absorbing sulfur dioxide in a solution which contains a soluble phosphate, a soluble citrate, and ammonium sulphate, withdrawing a portion of the solution and adding thereto a calcium compound selected from the group consisting of lime and calcium salts of volatile acids, removing precipitated gypsum, and returning the withdrawn portion to the said solution.

3. In a regenerative absorption process for sulphur dioxide, the steps comprising: absorbing sulphur dioxide in a solution which contains a soluble phosphate, a soluble citrate, and a neutral, soluble sulphate, withdrawing a portion of the solution, adding to the withdrawn portion a calcium compound selected from the group consisting of lime and calcium salts of volatile acids, removing precipitated gypsum from the portion, heating the portion to precipitate calcium salts of the weak acids, removing the precipitate, and returning the portion to said solution.

4. In a regenerative absorption process for sulphur dioxide, the steps for the purpose of removing accumulated sulphuric acid comprising absorbing sulphur dioxide in a solution containing a soluble phosphate, a soluble citrate and a sulphate selected from the group consisting of sodium sulphate, potassium sulphate, adding a calcium compound selected from the group consisting of lime, calcium salts of volatile acids, calcium phosphate and calcium citrate, separating precipitated gypsum from the solution, heating the solution, and separating the precipitated calcium salts of citric acid and phosphoric acid from the solution.

5. In a regenerative absorption process for sulphur dioxide the steps for the purpose of removing accumulated sulphuric acid comprising absorbing sulphur dioxide in a solution containing a soluble phosphate, a soluble citrate and ammonium sulphate, adding a calcium compound selected from the group consisting of lime and calcium salts of volatile acids, and separating precipitated gypsum from the solution.

6. In a regenerative absorption process for the recovery of sulphur dioxide wherein sulphur dioxide is absorbed in an aqueous salt solution adapted to absorb sulphur dioxide by chemical action and to disengage the absorbed sulphur dioxide on the application of heat, the step comprising adding a calcium compound to the solution in the presence of a substantial amount of a soluble neutral sulfate, said calcium compound being one capable of reacting with sulphuric acid to produce calcium sulphate.

7. In a regenerative absorption process for the recovery of sulphur dioxide, the steps comprising absorbing sulphur dioxide in an aqueous solution which contains a soluble phosphate, a soluble citrate, and a substantial amount of a soluble, neutral sulphate, and adding a calcium compound to the solution to precipitate accumulated sulphuric acid as calcium sulphate, said calcium compound being one capable of reacting with sulfuric acid to produce calcium sulfate.

8. In a regenerative absorption process for the recovery of sulphur dioxide wherein sulphur dioxide is absorbed in an aqueous salt solution adapted to absorb sulfur dioxide by chemical action and to disengage the absorbed sulfur dioxide on the application of heat, the step comprising adding a calcium compound selected from the group consisting of lime, calcium salts of volatile acids, calcium citrate, and calcium phosphate to the solution in the presence of a substantial amount of a soluble, neutral sulphate.

9. In a regenerative absorption process for the recovery of sulphur dioxide wherein sulphur dioxide is absorbed in an aqueous salt solution adapted to absorb sulfur dioxide by chemical action and to disengage the absorbed sulfur dioxide on the application of heat, the steps comprising removing accumulated sulphuric acid from a portion of the solution, in the presence of a substantial amount of a soluble, neutral sulphate, by adding a calcium compound thereto in an amount sufficient to precipitate all of the accumulated sulphuric acid and some of the sulphate, separating the precipitate from the portion, and returning the portion to the solution, said calcium compound being one capable of reacting with sulfuric acid to produce calcium sulfate.

10. In a regenerative absorption process for the recovery of sulphur dioxide wherein sulphur dioxide is absorbed in an aqueous salt solution adapted to absorb sulphur dioxide by chemical action and to disengage the absorbed sulphur dioxide on the application of heat, the steps comprising saturating a portion of the solution with sulphur dioxide, removing accumulated sulphuric acid from the portion, in the presence of a substantial amount of a soluble, neutral sulphate, by adding a calcium compound thereto in an amount sufficient to precipitate all of the accumulated sulphuric acid and some of the sulphate, separating the precipitate from the portion, and returning the portion to the solution, said calcium compound being one capable of reacting with sulphuric acid to produce calcium sulphate.

11. In a regenerative absorption process for the recovery of sulphur dioxide wherein sulphur dioxide is absorbed in an aqueous salt solution adapted to absorb sulphur dioxide by chemical action and to disengage the absorbed sulphur dioxide on the application of heat, the step comprising adding a calcium compound capable of reacting with sulphuric acid to produce calcium sulphate to the solution in the presence of a substantial amount of a soluble, neutral sulphate, separating the precipitate formed, expelling absorbed sulphur dioxide from the solution, separating any calcium salts precipitated by the expulsion, and employing the said calcium salts for removing sulphuric acid from a further batch of solution.

12. In a regenerative absorption process for the recovery of sulphur dioxide wherein sulphur dioxide is first absorbed in, and then upon heating expelled from, and aqueous solution containing a salt capable of combining chemically with sulphur dioxide, the steps comprising removing accumulated sulphuric acid from a portion of the solution, in the presence of a soluble, neutral sulphate, by adding a calcium compound thereto, said calcium compound being one capable of reacting with sulphuric acid to produce calcium sulphate.

13. In a regenerative absorption process for the recovery of sulphur dioxide wherein sulphur dioxide is first absorbed in, and then upon heating expelled from, an aqueous solution containing a salt capable of combining chemically with sulphur dioxide, the steps comprising withdrawing a portion of the solution and treating the same with a strong sulphur dioxide gas, removing accumulated sulfuric acid from the portion, in the presence of a soluble, neutral sulphate, by adding a calcium compound thereto, separating the portion from precipitated gypsum, and returning the portion to the solution, said calcium compound being one capable of reacting with sulphuric acid to produce calcium sulphate.

ARTHUR M. CLARK.